3,308,015
SYNERGISTIC INSECTICIDAL COMPOSITIONS
Paul D. Harwood and Dorothy M. Burkhart, Ashland, Ohio, assignors to Richardson-Merrell Inc., New York, N.Y., a corporation of Delaware
No Drawing. Filed Oct. 21, 1965, Ser. No. 500,248
9 Claims. (Cl. 167—24)

This invention relates to insecticidal compositions containing piperonyl butoxide and a Lobelia alkaloid. More particularly, this invention relates to synergistic insecticidal compositions of these materials wherein the insecticidal effectiveness of each component is enhanced by the presence of the other to produce an unexpected combined effect. Piperonyl butoxide, i.e., $\alpha$-[2-(2-butoxyethoxy)ethoxy]-4,5-methylenedioxy-2-propyltoluene, is a well known synergist for pyrethrum and rotenone.

The genus Lobelia is widely distributed in North America, particularly east of the Great Plains. Lobelia in northeastern North America contains 15 species. *Lobelia siphilitica* is commonly called the great Lobelia or the blue cardinal flower. *Lobelia inflata* is also called Indian tobacco. This is the species of Lobelia that has passed into human and veterinary medicine. Species of Lobelia generally not as prevalent as the above two are *Lobelia cardinalis*, *Lobelia dormanna*, *Lobelia urens*, *Lobelia erinus*, *Lobelia tupa*, and *Lobelia spicata*.

The literature contains references to testing of various Lobelia alkaloids or extracts for insecticidal activity. However, little or no activity was found, and indeed applicants' tests show the Lobelia alkaloids have little or no insecticidal activity. Martin Jacobson, Insecticides From Plants. A Review of the Literature, 1941–1953, Agriculture Handbook No. 154, states that *Lobelia inflata* was tested by Hartzel in 1944. Acetone and water extracts of the whole plant were ineffective against the mosquito larvae. Likewise Heal and co-workers, A Survey of Plants for Insecticidal Activity, Lloydia 13 (1950), tested an aqueous extract of the whole plant which was somewhat toxic to German cockroaches and not to American cockroaches and milkweed bugs. Heal and co-workers also used an aqueous extract of *Lobelia siphilitica* which was non-toxic to German and American cockroaches. Heal and co-workers, in 1953, tested aqueous extracts of *Lobelia inflata* and *L. tupa Linnceus*. Fluid extracts from the roots and the tops were non-toxic to German and American cockroaches and to milkweed bugs. Applicants have found that the chief alkaloids of *Lobelia inflata* will knock houseflies down after several hours of exposure; however, the flies uniformly recover unless kept with the alkaloids for nearly a day. It appears that this insecticidal activity is so limited that it is of little if any significant importance.

It has now been found that when a Lobelia alkaloid or an acid addition salt thereof is combind with piperonyl butoxide, the resulting composition has an insecticidal activity far greater than would be expected as a result of the additive effect of the components. High insecticidal efficacy of the composition is especially surprising in view of the fact that the components of this mixture possess very little insecticidal activity in themselves, and furthermore other alkaloids, e.g., nicotine, do not appear to be synergized with piperonyl butoxide. A particularly useful composition is one containing piperonyl butoxide together with a mixture of Lobelia alkaloids obtained by solvent extraction of a Lobelia plant. Inorganic or organic acids can be used to prepare the acid addition salts, and the alkaloids can be in acid addition salt form, e.g., nitrates, hydrochlorides, sulfates, actates, propionates, phosphates, citrates, and the like.

The insecticidal compositions of this invention have many advantageous properties. Thus, they degrade very rapidly in biological systems and do not accumulate in the manner of certain previously used insecticides. They are stable in storage for long periods and are not affected by light. They are relatively low in vertebrate toxicity. The Lobelia alkaloids act on the vertebrate in a manner similar to nicotine and curare. Nicotine has long been used as an insecticide despite all its well-known disadvantages. Nicotine is highly toxic and upon ingestion may prove fatal almost instantaneously. Nicotine is highly volatile and difficult to use safely. The Lobelia alkaloids are less toxic when injected and much less toxic by other routes. The Lobelia alkaloids are like nicotine quickly degraded either by microorganisms or in the bodies of metazoan animals. Unlike nicotine, the Lobelia alkaloids are non-volatile and stable in air. A Lobelia alkaloid or its acid addition salt plus piperonyl butoxide promptly causes the appearance of insecticidal symptoms. However, nicotine does not appear to be synergised by piperonyl butoxide. The activity of the Lobelia alkaloids appears to be quite different from that of the pyrethroids. For example, a mixture of piperonyl butoxide plus Lobelia alkaloids remains active on the glass surface for approximately a month. When similarly exposed to air, the insecticidal powers of the pyrethrins alone are lost almost instantaneously. Pyrethrins plus pipronyl butoxide remain active for several hours. However, the mixture does not remain active for days.

Lobelia alkaloids are a recognized group of alkaloids found in Lobelia plants; also, some of these alkaloids have been synthesized. These alkaloids are classified in the pyridine group of alkaloids or the pyridine:piperidine group. The chemistry of the Lobelia alkaloids is discussed in a number of texts and papers, including K. W. Bentley's The Alkaloids, volume I, 1957, Interscience Publishers, New York, pages 36–38. The alkaloids of Lobelia are also discussed by R. H. F. Manske and H. L. Holmes in The Alkaloids: Chemistry and Physiology, Academic Press, Inc., New York, volume I, page 189. Illustrative of Lobelia alkaloids, there can be mentioned: l-lobeline; dl-lobeline; lobelanine; lobelanidine; norlobelanine; norlobelanidine; dl-lelobanidine; l-lelobanidine I; l-lelobanidine II; d-norlelobanidine; lobinine; isolobinine; lobinanidine; isolobinanidine; lophilacrene; and lopheline.

A particularly useful composition of Lobelia alkaloids is that which is obtained by solvent extraction of a Lobelia plant. The extraction can take place at room temperature or elevated temperature, particularly under pressure as in an autoclave, with various solvents such as water, acetone, chloroform, ethanol, and combinations thereof. Methods for recovery of such alkaloids are described in British Patent 145,621 (1920); British Patent 145,622 (1920); British Patent 156,190 (1921); British Patent 314,532 (1928); and U.S. Patent 1,946,345 (1934).

The synergistic insecticidal compositions of this invention may be used on a wide variety of insect species, such as house flies (*Musca domestica*), stable flies (*Stomoxys calcitans*), cluster flies, blow flies, ants, and the like.

The synergistic compositions of this invention can be formulated as aqueous emulsions, as dry or wettable powders, as solutions or in any other suitable vehicle. The insecticidal compositions can be utilized as sprays, as dusts, as aerosol mixtures, insecticidal coating compositions and as residues. In general, they can be applied by methods commonly used for the control or reduction of insects. Thus, these insecticidal compositions can be formulated with solutions, diluents and carrier media, adhesives, sprays, wetting and emulsifying agents and other ingredients. The relative proportions of the active ingredients as well as the inert carriers, solvents, dispersions and the like can vary over broad limits. Thus, from about 0.5 to 50 parts of piperonyl butoxide can be used per part of alkaloid (or its acid addition salt) by weight. Preferably, from about 1 to 20 parts of piperonyl butoxide is used with one part of alkaloid and, particularly, 5 to 15 parts of piperonyl butoxide are employed with the alkaloid. Conventional techniques can be employed to intimately admix the piperonyl butoxide with the Lobelia alkaloid.

The quantities of the components in the final insecticidal compositions can vary over a broad range. Of course, the insecticidal compositions can be devoid of carriers, diluents or the like. Alternatively, the final composition can contain as little as about 0.1% of the mixture of piperonyl butoxide and Lobelia alkaloids, although it is preferred that the composition contain at least 0.5% of the synergistic mixture.

The following examples are illustrative of the invention.

EXAMPLE 1

Twelve grams of *L. siphilitica*, stalks, leaves and flower heads were cut into short pieces, placed in a flask with 200 ml. of tap water and autoclaved at a pressure of 15 lbs. p.s.i.g. for 15 minutes. The *L. siphilitica* was collected on October 1. The extract was filtered hot through a cheesecloth covered funnel and to 50 ml. of the extract 1 ml. of piperonyl butoxide was added. A filter paper was wetted with the preparation, placed in a large Petri dish (140 mm. in diameter) and 3 flies were placed in the dish. These were killed in one hour and 20 minutes. Knockdown was moderately rapid but death came more slowly. When the filter paper was removed from the dish, the residue remaining on the glass killed 5 flies in one hour and 10 minutes.

EXAMPLE 2

Twelve grams of *L. siphilitica* and 200 ml. of water was autoclaved at a pressure of 15 lbs. per square inch gauge (p.s.i.g.) for 15 minutes and 150 ml. of fluid recovered. Two-tenths ml. of the extract was placed in the bottom of each of 5 small Petri dishes (90 mm. in diameter). Piperonyl butoxide in graded amounts as shown in Table I was added to each dish and 4 flies were added. The results are shown in Table I.

TABLE I

| Lobelia alkaloid in Extract (µg.) | Piperonyl Butoxide (ml.) | Time to death of flies |
| --- | --- | --- |
| 16 | 0.04 | 1 hour. |
| 16 | 0.02 | 5 hours, 25 minutes. |
| 16 | 0.01 | 5 hours, 35 minutes. |
| 16 | 0.005 | 4 hours, 3 minutes. |
| 16 | 0.00 | All alive after 28 hours. |

EXAMPLE 3

Seventy mg. of lobeline sulfate was dissolved in 10 ml. of water and 0.1 ml. of piperonyl butoxide was added. The solution was smeared in the bottom of a Petri dish with the aid of a glass rod. Several flies were added to this dish and were all killed in 19 minutes. During the following 26 days a total of 63 flies in groups of 3 or 4 flies were placed in this Petri dish without addition of more insecticidal components. The dish was stored at laboratory temperatures. All flies were killed, but the time of exposure gradually increased to 9 plus hours on the 26th day.

EXAMPLE 4

10 mg. of lobeline sulfate were added to 10 ml. of water, and 0.2 ml. of the solution placed in each of 7 Petri dishes. Piperonyl butoxide was added and tests were conducted on two successive days as indicated in Table II where results are presented.

TABLE II

[The effect of 0.2 mg. of lobeline sulfate in solution plus graded amounts of piperonyl butoxide upon houseflies]

| Piperonyl butoxide (ml.) | Effect on 2 houseflies November 19 | Effect on 2 houseflies November 20 |
| --- | --- | --- |
| 0.001 | No effect in 3 hours | No effect in 4 hours. |
| 0.005 | Down after 1½ hours | Down 2½ hours. |
| 0.007 | Down after 40 minutes | Do. |
| 0.01 | Down after 25 minutes | Down 3 hours. |

EXAMPLE 5

Seventy mg. of lobelanine HCl were dissolved in water and 0.1 mg. of piperonyl butoxide was added to the solution. One-tenth ml. of the solution was pipetted in a 90 mm. Petri dish. On the first day 5 flies were confined in the Petri dish, and were killed in 35 minutes. In 26 days 63 flies were tested in this dish. All were killed, but the time from exposure to death gradually increased to more than 9 hours on the 26th day, which was considered the end of insecticidal activity.

EXAMPLE 6

Seventy mg. of lobelanidine were dissolved in 10 ml. of water. Using a glass rod two drops (approximately 10 mg.) were smeared on the bottom of a Petri dish and 4 flies confined to the dish. After 8 hours, the flies were down, but they did not die until sometime during the night. Possibly, starvation was a factor in their death. To the above solution, 0.1 ml. of piperonyl butoxide was added. One-tenth ml. of the solution was pipetted into a 90 mm. Petri dish. Four flies exposed in the dish were killed in 5 to 14 minutes. A total of 63 flies in groups of 3 or 4 individuals at a time were exposed to the Petri dish in the next 26 days. On the 26th day, the flies were killed after more than 9 hours exposure, which is considered the end of activity.

EXAMPLE 7

*Aerosol formulation*

| | | |
| --- | --- | --- |
| Freon 11 | gms | 22 |
| Freon 12 | gms | 25 |
| Acetone | gms | 3 |
| Lobelanidine | mg | 50 |
| Piperonyl butoxide | mg | 250 |

1.8 grams of total aerosol of the above formulation were injected into a cylinder (12 inches in diameter and 14 inches high) stocked with 33 flies. Ten flies were down in 10 minutes; 24 flies were down in 15 minutes; 30 down in 30 minutes. One and one-half hours after injection all flies were down. The cylinder was ventilated and one fly recovered sufficiently to fly, but showed some in-co-ordination.

EXAMPLE 8

Twenty-eight flies were introduced into the cylinder of Example 7 and sprayed for 1.5 seconds using 0.925 gram of the aerosol formulation of Example 7. 0.9 mg. of lobelanidine were introduced. Four flies were down in 10 minutes; 9 in 15 minutes; 20 in 30 minutes, and 25 in 1 hour. Three flies showed some in-co-ordination, but did not go down. The cage was ventilated after one hour, and only the 3 flies that were not knocked down recovered.

EXAMPLE 9

Tests with ants were limited to workers of the pavement ant (*Tetramorium caespitum*). Four 1000 ml. Erlenmeyer flasks were selected as cages, the top being closed with an inverted Petri dish. Ten ants were placed in flasks and sprayed with 0.475 gram of the aerosol formulation of Example 7. All ants were knocked down in 52 minutes. After one hour the flask was thoroughly ventilated, but none recovered. Seven ants were placed in a second flask and sprayed with 0.490 gm. of the same formula. The Petri dish closing the top was removed briefly every minute for 25 minutes. One hour after ventilating one ant was walking about. A third flask was stocked with 14 ants, and sprayed with 0.550 gm. of the aerosol formula of Example 7. All were knocked down in 45 minutes. The flask was opened and ventilated. One hour and 45 minutes later there were no recoveries. Similar results were obtained with lobelanine and lobeline when substituted for lobelanidine in aerosol formulations similar to that of Example 7.

What is claimed is:

1. An insecticidal composition comprising piperonyl butoxide and a member selected from the group consisting of a Lobelia alkaloid and an acid addition salt thereof.

2. An insecticidal composition of claim 2, wherein the composition contains from about 1 to about 20 parts of piperonyl butoxide per part of said member.

3. An insecticidal composition of claim 2, wherein said member is an alkaloid.

4. An insecticidal composition of claim 1, wherein the alkaloid is lobeline.

5. An insecticidal composition of claim 1, wherein the alkaloid is lobelanine.

6. An insecticidal composition of claim 1, wherein the alkaloid is lobelanidine.

7. An insecticidal composition comprising piperonyl butoxide and a mixture of Lobelia alkaloids.

8. An insecticidal composition comprising piperonyl butoxide and a mixture of Lobelia alkaloids obtained by solvent extraction of a Lobelia plant.

9. An insecticidal composition of claim 8, wherein the Lobelia alkaloids are obtained from the plant *Lobelia siphilitica*.

No references cited.

SAM ROSEN, *Primary Examiner.*

S. J. FRIEDMAN, *Assistant Examiner.*